(12) United States Patent
Kuttappa et al.

(10) Patent No.: US 11,593,466 B1
(45) Date of Patent: Feb. 28, 2023

(54) NARRATIVE AUTHENTICATION

(71) Applicant: Wells Fargo Bank, N.A., San Francisco, CA (US)

(72) Inventors: Shobha Aiyanda Kuttappa, Bangalore (IN); Radhika Sreeramoju, Hyderabad (IN); Anusha Rajkumar Naik, Bangalore (IN); Nithya Mani, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 661 days.

(21) Appl. No.: 16/452,781

(22) Filed: Jun. 26, 2019

(51) Int. Cl.
*G06F 21/32* (2013.01)
*G06F 21/62* (2013.01)
*G06K 9/62* (2022.01)
*G10L 25/63* (2013.01)

(52) U.S. Cl.
CPC .......... *G06F 21/32* (2013.01); *G06F 21/6245* (2013.01); *G06K 9/6215* (2013.01); *G10L 25/63* (2013.01)

(58) Field of Classification Search
None
See application file for complete search history.

(56) References Cited

U.S. PATENT DOCUMENTS

| | | | |
|---|---|---|---|
| 5,548,647 A | | 8/1996 | Naik et al. |
| 6,463,415 B2 * | | 10/2002 | St. John .................. G07C 9/37 704/273 |
| 6,510,415 B1 | | 1/2003 | Talmor et al. |
| 7,054,811 B2 | | 5/2006 | Barzilay |
| 7,340,042 B2 | | 3/2008 | Cluff et al. |
| 8,396,711 B2 | | 3/2013 | Yee et al. |
| 8,447,111 B2 | | 5/2013 | King et al. |
| 8,595,007 B2 | | 11/2013 | Kane |
| 9,369,488 B2 | | 6/2016 | Woods et al. |
| 9,519,620 B1 | | 12/2016 | Pinel et al. |
| 9,672,825 B2 | | 6/2017 | Arslan et al. |
| 9,697,836 B1 | | 7/2017 | Lousky et al. |
| 9,837,078 B2 | | 12/2017 | Warford et al. |
| 9,842,250 B2 | | 12/2017 | Macdonald |
| 10,565,365 B1 * | | 2/2020 | Watson .................. G10L 25/51 |
| 10,867,612 B1 * | | 12/2020 | Pollack .............. G06K 9/00892 |
| 11,074,328 B2 * | | 7/2021 | Tong .................... G06F 21/604 |

(Continued)

OTHER PUBLICATIONS

Hoover, Narrative Passwords: Potential for Story-Based User Authentication, Dec. 2015, ProQuest, 86 Total Pages (Year: 2015).*

(Continued)

*Primary Examiner* — Christopher C Harris
(74) *Attorney, Agent, or Firm* — Womble Bond Dickinson (US) LLP

(57) ABSTRACT

Authentication is performed based on a user narrative. A narrative, such as a personal story, can be requested during a setup process. Content, voice signature, and emotion can be determined or inferred from analyzing the narrative. Subsequently, a user can provide vocal input associated with the narrative, such as by retelling the narrative or answering questions regarding the narrative. The vocal input can be analyzed for content, voice signature and emotion, and compared with the initial narrative. An authentication score can then generated based on the comparison.

19 Claims, 11 Drawing Sheets

(56) References Cited

U.S. PATENT DOCUMENTS

| | | | |
|---|---|---|---|
| 2003/0154406 A1* | 8/2003 | Honarvar | G06Q 20/4014 |
| | | | 726/10 |
| 2006/0277043 A1 | 12/2006 | Tomes et al. | |
| 2015/0278820 A1 | 10/2015 | Meadows | |
| 2016/0292408 A1 | 10/2016 | Zhang et al. | |
| 2016/0372116 A1* | 12/2016 | Summerfield | G10L 15/063 |
| 2017/0078262 A1* | 3/2017 | Riddick | G06F 21/31 |

OTHER PUBLICATIONS

Somayaji, Towards Narrative Authentication Or, Against Boring Authentication, Sep. 9, 2013, 7 Total Pages (Year: 2013).*

* cited by examiner

NARRATIVE AUTHENTICATION

BACKGROUND

Authentication and authorization are often required to access protected resources such as financial or other confidential data. Authentication is a process of verifying the identity of a person or other entity. Stated differently, authentication seeks to confirm that a person is who the person claims to be. The process involves comparing one or more provided credentials with credentials on file for the person. A credential is thus proof of identity. By far the most common credential is a text-based password. For example, a person often provides a password over the phone or online when seeking access to financial data. If authentication is successful, an authenticated person is next subjected to an authorization process to determine whether the authenticated person should be permitted to access protected data. Once successfully authenticated and authorized a person is granted access to a protected resource.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to narrative authentication. A first vocal narrative, such as a personal user story, can be received, for example as part of a setup process. The first vocal narrative can be analyzed to determine content of the narrative, voice signature, and emotion. Subsequently, as part of an authentication process a user can provide a second vocal narrative. The second vocal narrative can be analyzed to determine content of the narrative, voice signature, and emotion, and compared to the first vocal narrative. Based on the result of the comparison, an authentication score can be generated reflecting similarities and differences. Additionally, or alternatively, questions can be generated, regarding the first vocal narrative, and submitted to a user. Answers to the questions can be analyzed for correctness, voice signature, and emotion, and compared to the first vocal narrative. An authentication score can be generated that reflects differences and similarities associated with the questions compared to the first vocal narrative. Based on the authentication score, a user can be said to pass or fail authentication. Alternatively, the authentication score can be provided and employed to determine user authorization with respect to access and interaction with resources.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Figure 1:
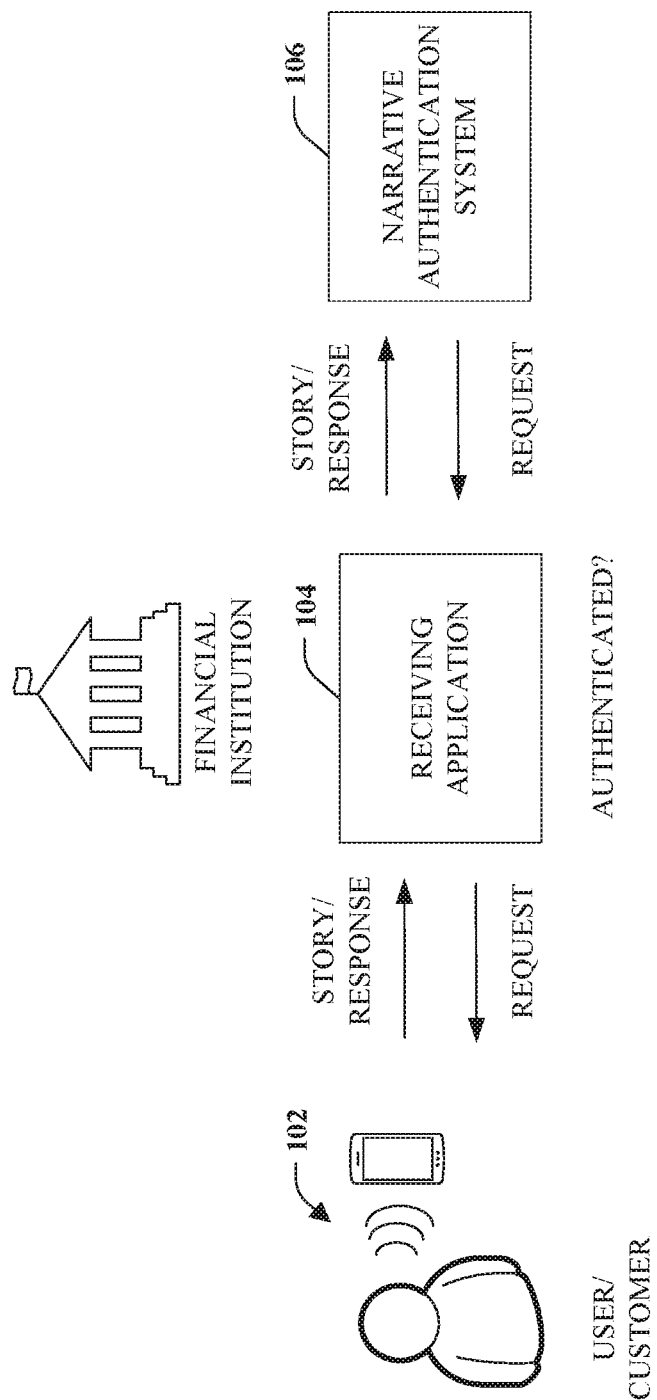
FIG. 1 is a diagram of an overview of an example implementation.

Text-based passwords are heavily employed for authentication, but such passwords can be guessed, stolen, and difficult to recall. Often a password is required to conform to particular standards so that they cannot be easily guessed. For example, a password may have to use at least eight characters including a combination of numbers, letters, and at least one special symbol (e.g., asterisk, parenthesis, bracket . . . ). Further hindering memorability are differing password standards among systems and a requirement a password be changed periodically. The ubiquity of access control systems that entail a password also requires people remember numerous passwords. Furthermore, infrequently used passwords are even harder to recall than those employed daily.

Password based issues are exacerbated for senior citizens. In addition to difficulty recalling passwords, senior citizens are unfortunately targets of unscrupulous caretakers and fraudsters. For example, a caretaker can gather information about individuals including account information and password and initiate transactions on their behalf. Further, in certain cases, individuals may be coerced into performing transactions under duress that they would not have made but for the coercion.

Details provided herein pertain to narrative authentication. Rather than requiring recollection of an arbitrary text-based password as proof of identity, a narrative, such as a personal story, can be employed. During access setup, a user can provide a vocal narrative, for example by way of a phone. The vocal narrative can be analyzed to determine content and voice signature. Furthermore, emotion associated with the vocal narrative or portions thereof can be determined or inferred. Subsequently, authentication can be performed based on the provided narrative. In one instance, the user can be asked to retell the narrative. The retold narrative can then be analyzed and compared to the initial narrative. In addition to determining whether the story details are accurate, voice signature and emotion can also be determined and compared. Additionally, or alternatively, questions can be generated regarding the narrative and presented to a user. Answers can be collected and compared to correct answers as well as expected voice signature and emotion. The result of comparing an initial narrative to a retold narrative or answers to questions regarding the initial narrative is an authentication score. The authentication score can capture a likelihood that a user is who the user claims to be based on how closely the retold narrative or answers match the initial narrative.

Narrative authentication has a variety of advantages over conventional text-based passwords and other credentials. First, a user narrative, such as a personal story, is difficult to guess and easy to recall. Second, utilizing voice based analysis, including voice signature and emotion, improves security, since it is unlikely that someone else will be able to replicate such communication even if they know the story. For instance, even a subtle change in tone or speaking style can be a red flag that prevents authentication. Further, the disclosed authentication can utilize simple conversation with users without creating a feel of a security check or increasing stress levels when personal questions are asked.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, an overview of an example implementation is illustrated and described herein. A user, or customer, 102 can desire to access account information or perform a transaction with respect to a financial institution, such as a bank. In furtherance of this desire, the user 102 can initiate a call to the financial institution with a standard telephone, smart phone, or other computing device. Receiving application 104 can receive the call, load basic customer information, and trigger the narrative authentication system 106 to authenticate the user. Assuming narrative authentication was previously setup by providing a narrative, such as a personal story, a request for vocal input is submitted to the user. In one instance, the request can ask the user 102 to retell a personal story. The narrative authentication system 106 can receive and analyze the story with respect to the story provided at setup. The analysis can involve determining the accuracy of the story with respect to the previous story as well as comparing voice signature and one or more emotions associated with the story or parts of the story. In another instance, the request can ask the user 102 questions regarding a previously provided story. Answers can be compared to the story to determine correctness. Inferred emotion and voice characteristics, among other things, can also be compared. In one scenario, questions can be generated and provided to the user 102 after a retelling of the story leaves out some details. Based on analysis of the retold story or question answers, the narrative authentication system 106 can produce an authentication score, or a probability score, indicating the likelihood that the user 102 is who the user claims to be. The receiving application 104 can receive and use the score with respect to authorizing access and action of the user 102, for example to permit some actions while prohibiting others based on the score.

By way of example, assume a customer initiates a call to their bank to perform a transaction withdrawing some amount of money from an account, and they have previously setup access by providing a story regarding a beach vacation the customer took as a child. The received call can trigger narrative authentication and multiple questions could be dynamically generated and provided to the customer. The questions could be true-false, multiple-choice, short-answer, or a combination. Answers to the questions can be received and analyzed for correctness as well as comparison of voice signature and emotion associated with the answers with the initial story provided at setup. An authentication score can be generated based on answer correctness and the comparison of the voice signature and emotion. If the score is less than fifty, the customer could be directed to the nearest bank branch for further assistance and the call ended. If the score is between fifty and eighty, further authentication may be required, for instance by way of additional questions or requesting retelling of the story. If the score is greater than eighty, and a transaction is within a predetermined limit, the transaction could be processed.

Figure 2:
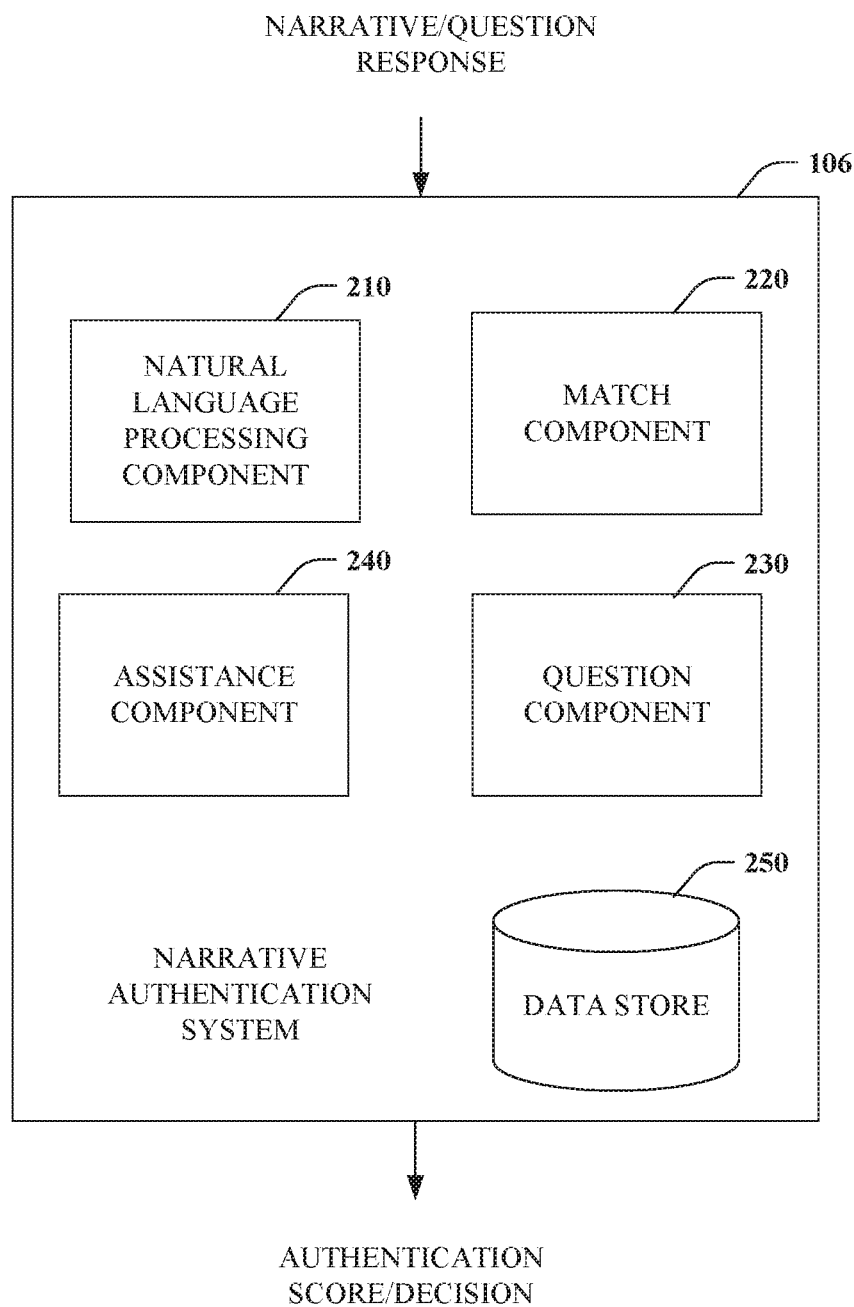
FIG. 2 is a schematic block diagram illustrating a narrative authentication system.

FIG. 2 illustrates a sample narrative authentication system 106 in further detail. The narrative authentication system 106 receives as input a spoken narrative or response to questions and returns as output an authentication score indicative of a probability that a user is who the user claims to be or a binary decision of authenticated or unauthenticated. The narrative authentication system 106 comprises natural language processing component 210, match component 220, question component 230, assistance component 240, and data store 250.

The natural language processing component 210 analyzes narratives to enable detection of changes. In furtherance thereof, the natural language processing component 210 can capture voice characteristics or speaking style of a user. Furthermore, the analysis can determine, detect, or infer emotion associated with a narrative or portions of the narrative. Emotions can include varying degrees of, among others, joy, surprise, love, anger, sadness, and fear. For example, anger can be broken down further into rage, disgust, frustration, and irritation.

Figure 3:
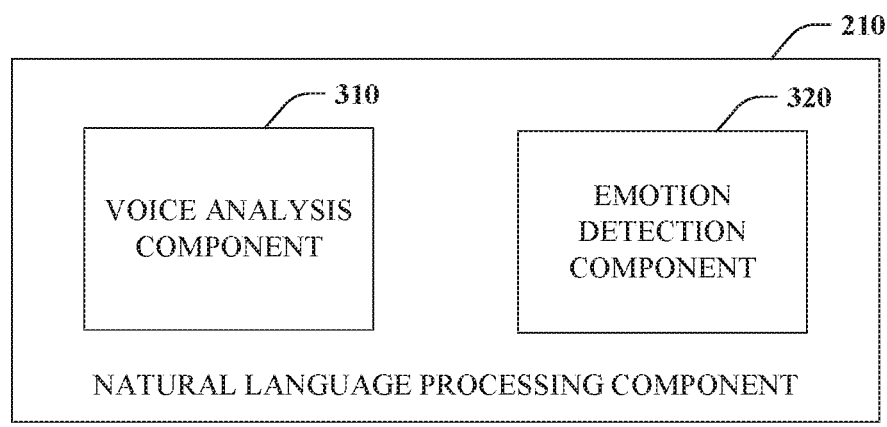
FIG. 3 is a schematic block diagram of a natural language processing component.

Turning attention to FIG. 3, an example natural language processing component 210 is illustrated in further detail. The natural language processing component 210 includes voice analysis component 310 and emotion detection component 320.

The voice analysis component 310 is a mechanism or means to analyze a voice associated with a narrative. The analysis can pertain to determining various voice characteristics or speaking style. For example, the frequency and pitch of a user's voice can be determined from an initial story provided at setup or during other interactions prior to or after setup. In this manner, the voice analysis component 310 can determine a voice print for a user that is unique due to the shape of vocal cavities and the way a user moves his or her mouth when speaking. However, the voice analysis component 310 can also detect and determine features associated with a speaking style unique to a user. Such features include tone, accent, placement of silence, frequency of filler words (e.g., uh and um), spacing of words, repetition, inflection, pace, volume, and clarity, among other things. Stated differently, the voice analysis component 310 is configured to assemble a voice signature for a user based on a number of factors.

The emotion detection component 320 is a mechanism or means for detecting emotion in a narrative or portion of the narrative. Emotions such as joy, sadness, anger, fear, and love, or various degrees thereof, can be determined or inferred and attributed to a communicated story or portions of the story. Emotions can be determined based on a variety of factors. For instance, keywords used in a narrative can indicate emotion directly. For example, if a user describes an event as a fantastic or terrible experience, emotions such as joy or anger, respectively, could be attributed to the event. Other factors that can be used to infer emotion include tone of voice and changes in speech pattern. Tone of voice is a manner of speaking that changes the impression given words and can capture how a user is feeling about what is said. Tone of voice can be detected or inferred based on pitch, intonation, volume, and tempo. For example, sarcasm can be detected such that expression that an event was "great" conveys that it was not. Further, a keyword determination of joy can be replaced with anger or frustration based on detection of sarcasm. As another example, detection of a quaver, namely a trembling or shaking sound, in a user's voice can indicate fear or nervousness, perhaps as a result of the user being coerced into making a transaction. The emotion detection component 320 can also detect and employ changes in speech patterns to determine or infer emotion. A speech pattern is a distinct manner of expression associated with a user, which can also be referred to as default or baseline speaking style. For instance a speech pattern can capture accents, placement of silence, frequency of filler words (e.g., uh and um), spacing of words, inflections, repetition, pace, volume, and clarity, among other things. Changes in speech patterns from a baseline can indicate particular emotions. For instance, a change from a loud, fast speech pattern to a quiet, slow speech pattern can be indicative or nervousness or embarrassment. By contrast, a change from a quiet, slow speech pattern to a loud, fast speech pattern may be indicative of joy or excitement.

Returning back to FIG. 2, the match component 220 is a mechanism or means for determining matches or an extent of match between a prior narrative and a current narrative. Further, the match component 220 can generate and authentication score based at least in part on the extent of match. By way of example, a retold story can be determined to be a ninety percent match with the original story including accuracy and emotion. This can correspond to a ninety percent authentication score. However, the score could be further altered based on other factors that either increase or decrease the authentication score. Alternatively, the match component 220 can be provided with a predetermined threshold regarding what is to be deemed a match and what is deemed a non-match. For example, a threshold for a match could be ninety percent, such that narratives that are ninety percent similar or greater are deemed matches while narratives that are less than ninety percent similar are deemed non-matches.

In one instance, the user can retell a previously provided narrative or story. Additionally, or alternatively, questions regarding the narrative can be provided to the user. The question generation component 230 is a mechanism or means to generate questions regarding a narrative. The question generation component 230 can analyze the narrative and automatically generate questions related to the narrative. Questions can correspond generally to one or more of who, what, where, and when. For example, if the narrative describes a vacation a user took, questions can pertain to who went on the vacation, what they did, where they went, and when the vacation took place. The questions can be binary questions, such as true-false or yes-no, or require additional input in the form of short answers. Further, questions can be generated that are based on a false statement of fact regarding the narrative or are unrelated to the narrative. Continuing with the vacation example, if the user took a trip to Hawaii, a question can be generated that asks if the user's trip was to the Bahamas or if the user enjoyed the trip to the Bahamas.

The match component 220 can determine whether the response matches the answer expected as provided by the question component 230 and generate an authentication score based thereon. In cases, where a further narrative response is required, the natural language processing component 210 can be invoked to analyze the vocal response and optionally detect emotion in the response. The match component 220 can then determine not only whether or not the answer was correct but that the voice and emotion correspond to what is expected. The authentication score can be adjusted based on whether or not the answer is correct, and the voice and emotion are as expected.

The assistance component 240 is a mechanism or means for aiding a user in at least recitation of an initial narrative. Certain features of a narrative are better than others for purposes of authentication. Generally speaking, descriptive narratives that answer questions including who, what, where, and why can be most valuable. The assistance component 240 can analyze what a user has provided and prompt the user for more information to guide a user toward specification of a valuable narrative for purposes of authentication. For instance, if a narrative is short and impersonal, the user assistance component 240 can prompt a user for information to resolve these issues. More specifically, a user can be prompted to provide information regarding at least who, what, where, when and why. As a result, questions can be generated that are valuable in later authenticating a user.

The data store 250 can save data for subsequent access and processing. For example, results of narrative analysis by the natural language processing component 210 can be saved to the data store and retrieved by the match component. Additionally, generated questions can be saved to the store for later retrieval and deployment. The data store corresponds to a non-volatile storage medium capable of storing a collection of data so that data can be easily accessed, managed, and updated. In accordance with one embodiment, the data store 250 can correspond to a database or database management system (DBMS) that interacts with users, applications, and the database itself for creating and managing databases.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but known by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, such mechanisms can be utilized by the natural language processing component 210 in inferring emotions associated with a narrative.

Figure 4:
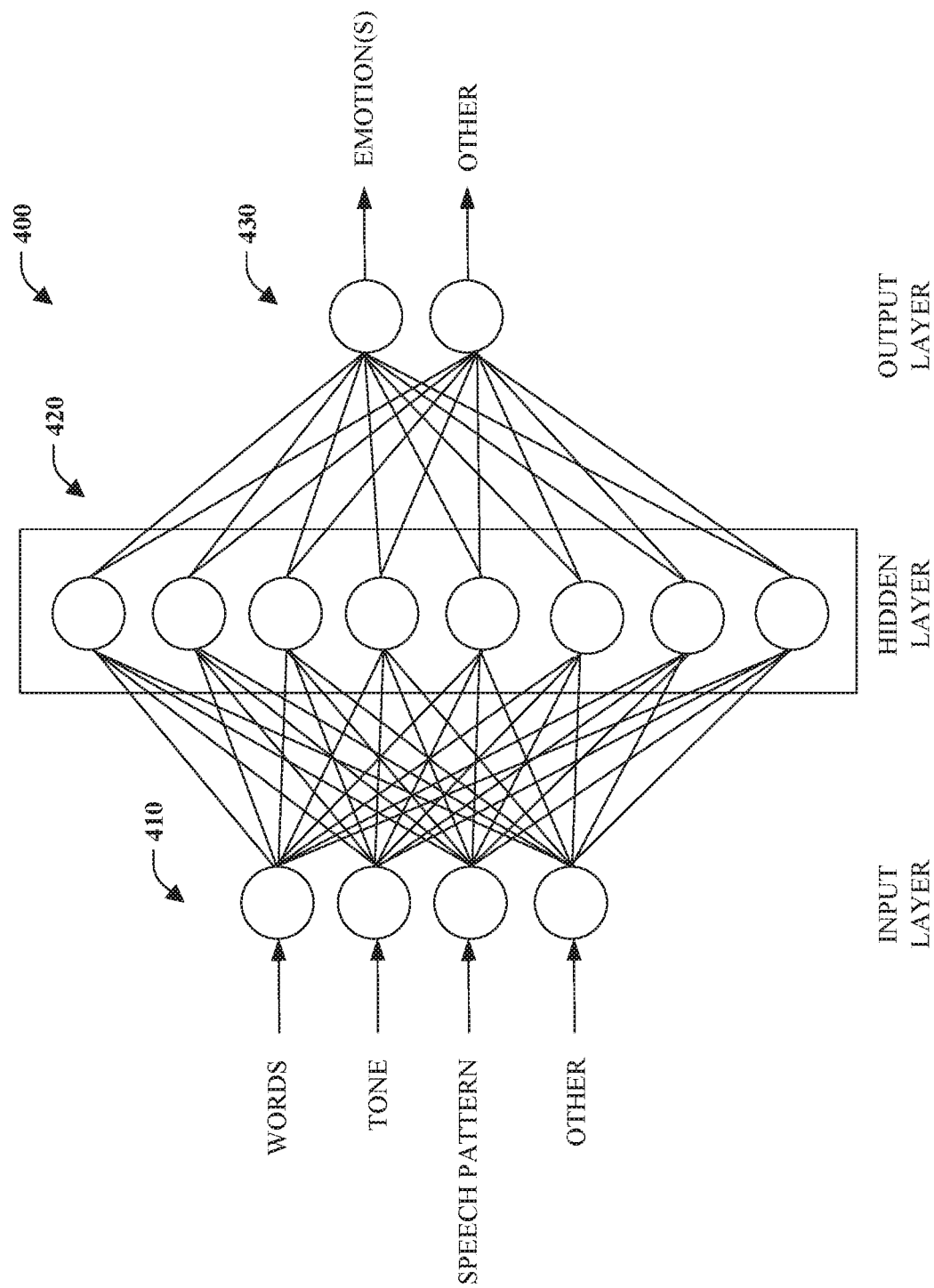
FIG. 4 is an illustration of an artificial neural network.

Turning attention to FIG. 4, an artificial neural network 400 is depicted for use in natural language processing including emotion inference. The artificial neural network 400 includes a number of artificial neurons represented by circles and connections between the artificial neurons. Each artificial neuron is represented by a value that represents all inputs to the neuron. There are three groups of artificial neurons, input layer 410, hidden layer 420, and output layer 430. The input layer comprises artificial input neurons that bring initial data into the system and pass the data to the hidden layer 420. As shown, the input layer 410 can receive data corresponding to words, tone, and speech pattern, among other inputs. The hidden layer 420 is the portion of the artificial neural network 400 that is capable of learning. The hidden layer 420 nodes perform computations and transfer information from input to output nodes. Nodes that comprise the output layer 430 are responsible for computations and transferring information from the neural network 400 to the outside world. Here, the output layer 430 comprises a node that identifies one or more emotions associated with a particular narrative of portion thereof. The neural network 400 can learn to identify emotions by way of supervised learning, unsupervised learning or reinforcement learning in conjunction with forward and backward propagation. Once trained the artificial neural network 400 can be utilized to identify emotions associated with a narrative. The artificial neural network 400 or additionally linked networks can also be employed to further determine perform natural language processing and authentication.

In view of the exemplary systems described above, methods that may be implemented in accordance with the disclosed subject matter will be better appreciated with reference to flow chart diagrams of FIGS. 5-10. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 5:
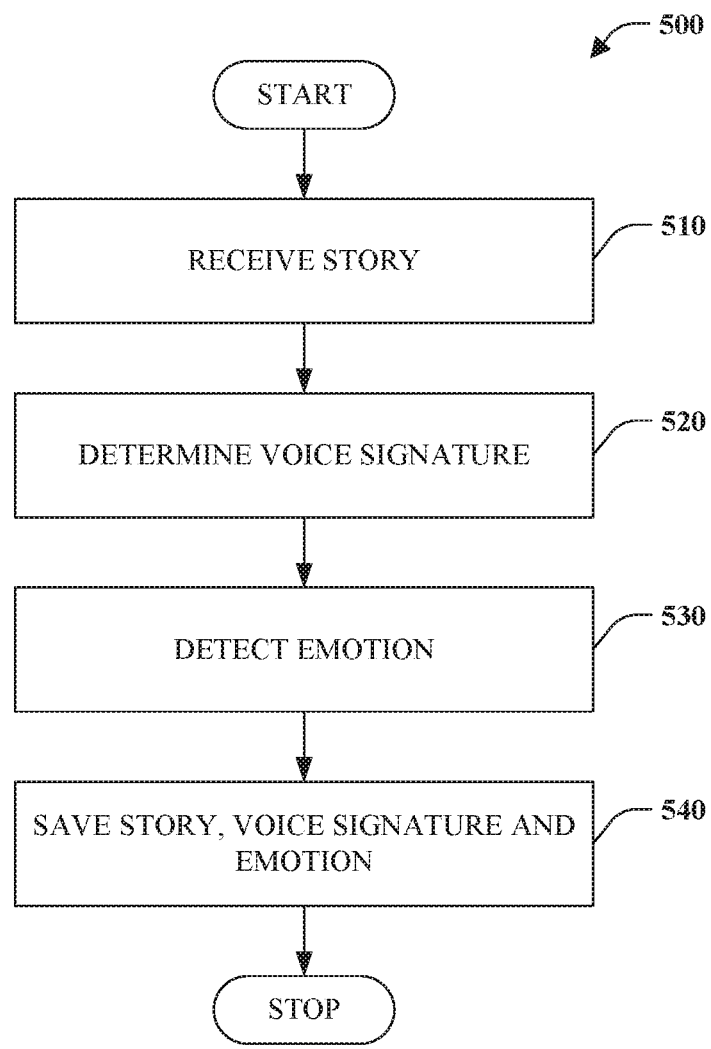
FIG. 5 is a flow chart diagram of a method of pre-processing.

FIG. 5 illustrates a method 500 of pre-processing. At numeral 510, a narrative or story is received. The story can be recited audibly by a user utilizing a phone or computing device, and received by a system as part of authentication. At 420, a voice signature is determined, for example by voice analysis component 310. Here, analysis is performed on the narrative to determine various voice characteristics and speaking style of a user. By way of example, frequency and pitch of a user's voice can be determined from the story. Further, tone, accent, placement of silence, frequency of filler words, spacing of words, repetition, inflection, pace, volume and clarity among other things can be determined from the story. At numeral 530, emotion is detected with respect to the narrative, for example by emotion detection component 320. Emotions can be determined from the narrative based on a variety of factors including keywords, tone of voice, and changes in speech pattern. Keywords can indicate directly how a user is feeling about portions of their stories, which can further be informed by tone of voice and changes in speech patterns. At 540, the story, voice signature, and emotion can be saved for subsequent processing, for instance in data store 250.

Figure 6:
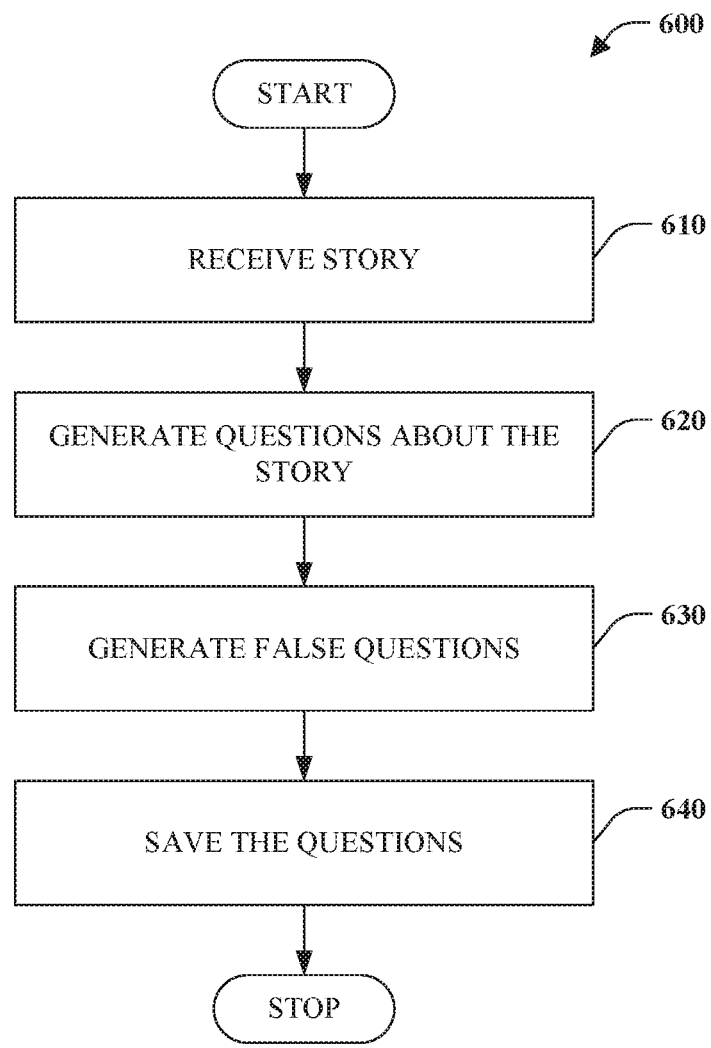
FIG. 6 is a flow chart diagram of a method of question generation.

FIG. 6 is a flow chart diagram of method 600 of question generation, for example as performed by question component 230. At reference numeral 610, a story is received. The story can be received in real time or near real time as a user is reciting the story. Alternatively, an audible or converted text-based version of the story can be received from a data store, such as data store 250. At 620, questions are generated regarding the story. In one instance, questions can address who, what, where, and when. For example, if the story describes a beach vacation, questions can be generated regarding who went with the user on the vacation, where did they go, and what did they do. The questions can be of various types including true-false, multiple-choice, or short-answer. At numeral 630, one or more false questions are generated. As used herein, a false question is a question based on a false statement of fact associated with the narrative or unrelated to the narrative. For example, if the narrative indicated the user went on vacation with her best friend, a false question could ask whether the user went on vacation with her mother. Such false questions add an additional layer of security to prevent, among other things, easily guessed answers. At numeral 640, the generated questions are saved, for example to the data store 250, for subsequent employment for authentication. Alternatively, the questions can be generated dynamically during authentication as opposed to being pre-generated and stored.

Figure 7:
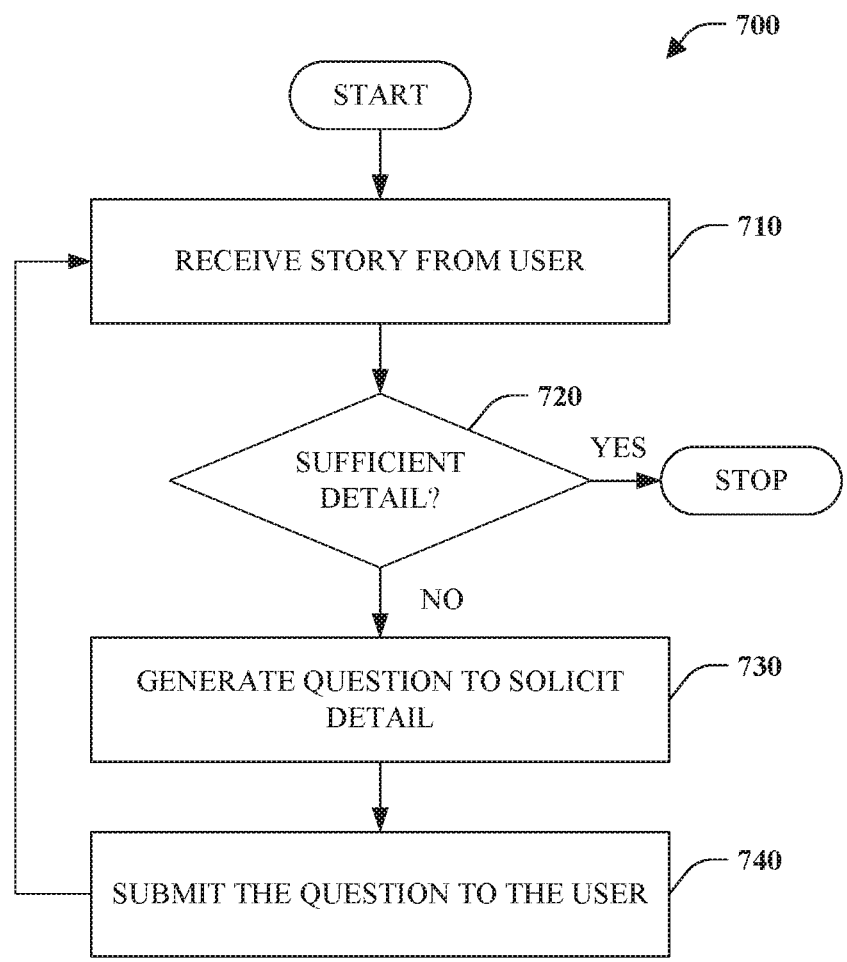
FIG. 7 is a flow chart diagram of a method of narrative assistance.

FIG. 7 illustrates a method 700 of narrative assistance, for example performed by the assistance component 240. At numeral 710, a narrative or story is received from a user. For example, during setup of an account or the like, a user can be prompted to provide a personal story regarding an event or incident. At 720, a determination is made as to whether or not sufficient detail has been provided in the story to enable authentication to occur based on the story. If sufficient detail has been provided ("YES"), the method terminates. Alternatively, if sufficient detail has not been provided ("NO"), the method continues at 730, wherein a question is generated to solicit detail. For example, a question can concern who, what, and where, such as who was with the user during the event, where they were at, and what were they doing. At numeral 740, the question is submitted to the user as a prompt for more information. The method continues at 710 where the story is modified in response to the question and the process continues until sufficient detail is provided.

Figure 8:
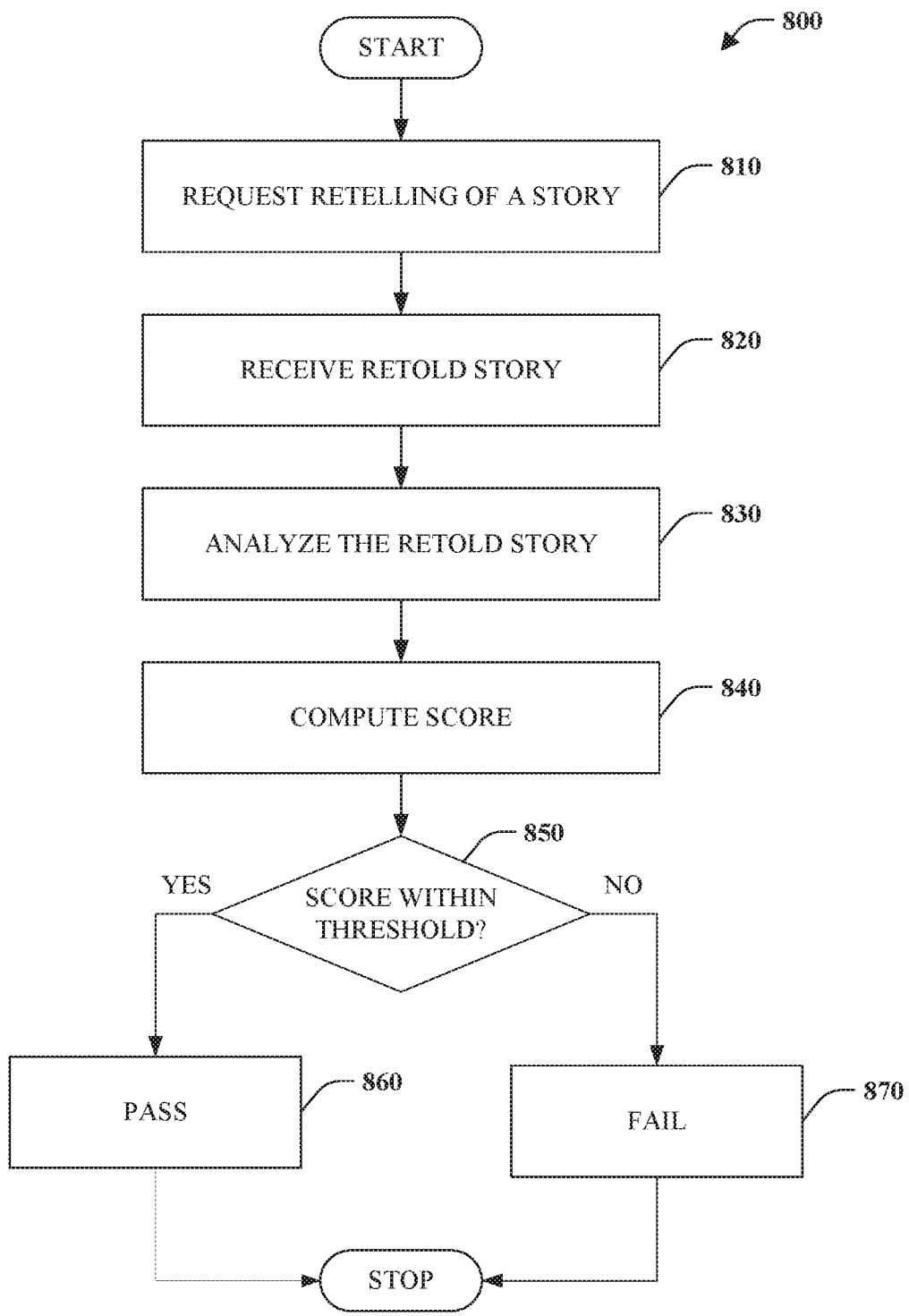
FIG. 8 is a flow chart diagram of a method of authentication.

FIG. 8 illustrates an authentication method 800, for example performed by the narrative authentication system 106. At numeral 810, a request is made to retell a previous story. In response to the request, a retold story is received at 820. In accordance with an embodiment, the retold story is a spoken narrative provided by way of a phone or computing device. At 830, the retold story is analyzed. The analysis can involve comparing the accuracy of the retold story to an original story provided during setup. Further, the analysis can involve determining a voice signature associated with the retold story and comparing the voice signature to a previous voice signature associated with the original story. The voice signature can comprise features such as voice frequency and pitch as well as data regarding tone, accent, placement of silence, frequency of filler words (e.g., uh and um), spacing of words, repetition, inflection, pace, volume, and clarity, among other things. Furthermore, emotion detected for the retold story or portions thereof can be compared to the emotion detected for the original story or portions thereof. Emotion can be detected based on keywords, determined tone of voice, and changes in speech pattern, among other things. At numeral 840, an authentication score is computed based on the comparison of stories, voice signatures and emotion. For example, authentication score can correspond to the degree of match between the original story and the retold story in terms of story accuracy, voice signature, and emotion. At 850, a determination is made as to whether or not the authentication score is within a predetermined threshold associated with authentication. If the score is within the threshold ("YES"), authentication passes at 860. In other words, the user's identity is confirmed. If the score is not within the threshold ("NO"), authentication fails at 870. In this case, a user's identity is not confirmed. Rather than making a binary decision on whether or not to authenticate a user, in an alternate embodiment, the authentication score computed at 840 can simply be returned, for instance, to enable control of authorization to resources to be based on the authentication score.

Figure 9:
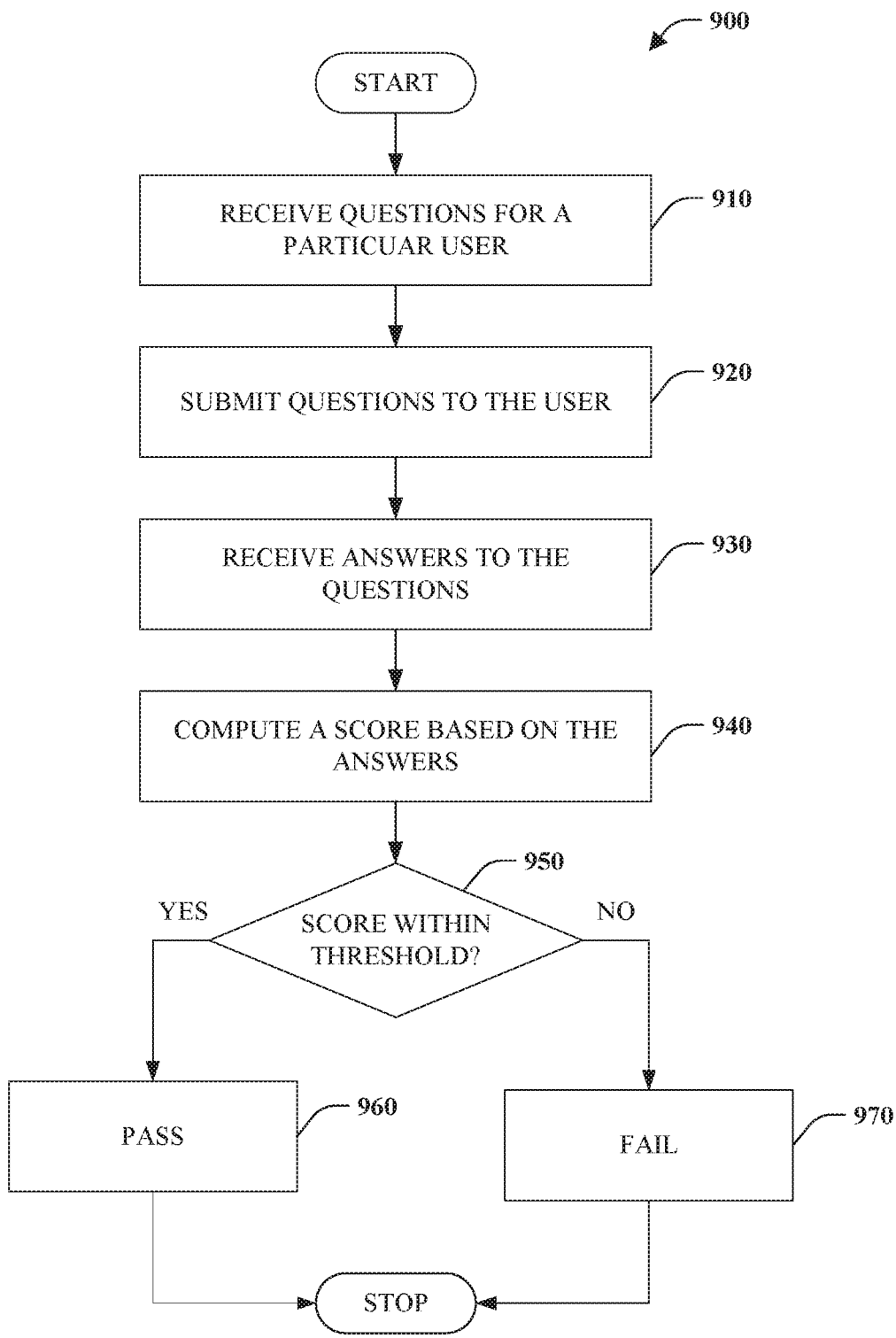
FIG. 9 is a flow chart diagram of an authentication method.

FIG. 9 is a flow chart diagram of an authentication method 900, for example executed by the narrative authentication system 106. At reference numeral 910, one or more questions are received for a particular user. The questions can be questions not previously provided to the user, and can be received from a data store, such as data store 250, or received after dynamic generation. Further, the questions can be of substantially any type including true-false, multiple-choice, and short-answer, among others. At 920, the received questions are submitted to the user. For example, the text-to-speech functionality can be employed to produce an audible version of each question to play for the user. At 930, answers to the one or more questions are received from the user. In one instance, the answer can be an audible response that can be converted to text by a speech-to-text converter to enable subsequent text-based processing. At 940, an authentication score is computed based on the answers. The score can be computed based on whether or not the responses are correct answers to the questions. Further, in the case of short-answer questions, a voice signature and emotion can be determined and compared with a previous voice signature and emotion determined with respect to an original story. For instance, even if the answer to a question is correct the authentication score can be low based on differences in voice signature and emotion. By way of example, consider a correct answer but a detection of fear or nervousness in view of a trembling or shaky voice. In this case, the authentication score can be reduced significantly. At 950, a determination is made as to whether or not the authentication score is within a predetermined threshold associated with authentication. If the score is within the threshold ("YES"), authentication is passed at 960. On the other hand, if the score is not within the threshold ("NO"), the authentication fails or is denied at 970. In an alternative embodiment, the score can simply be reported without making a decision on whether authentication passes or fails. Rather, the score can be utilized with respect to rules regarding authorizing access to resources.

Figure 10:
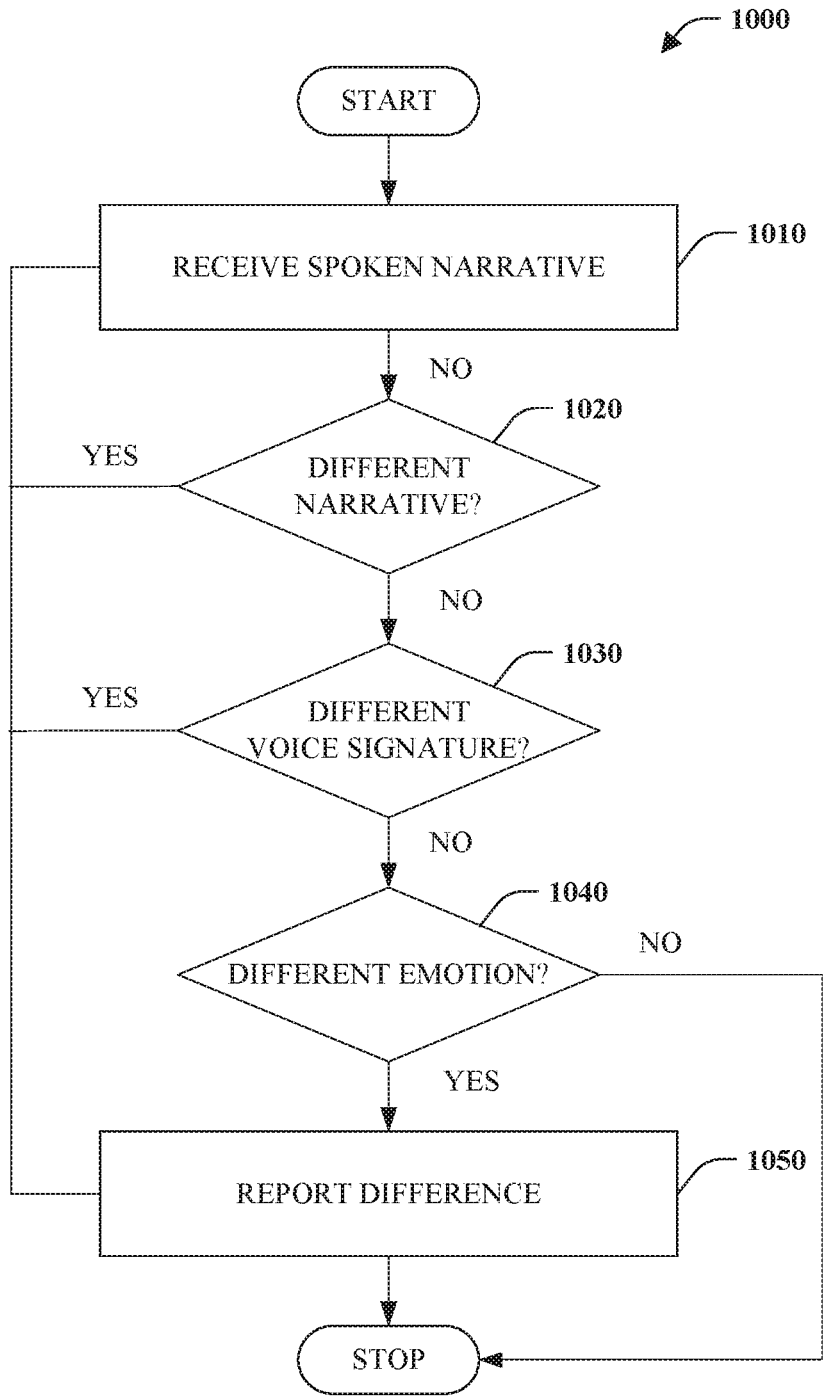
FIG. 10 is a flow chart diagram of a method for analyzing a narrative.

FIG. 10 is a flow chart diagram of a method 1000 of analyzing a narrative, for example as performed by the narrative authentication system 106. At numeral 1010 a spoken narrative is received. For example, the narrative can be provided in conjunction with a user identifier for authentication.

At 1020, a determination is made as to whether or not the narrative received is different from a prior narrative received during setup. More particular, the comparison is to determine whether the narrative being told is different within a threshold of the prior narrative. A story told a second time will often be slightly different. Accordingly, the analysis can concern significant differences regarding main ideas of the narrative (e.g., who, what, where, when . . . ) as opposed to minor differences in the way a story is told. If the determination, at 1020, is that the narrative is different ("YES"), the differences are reported at 1050. If the determination is that the narrative is not different ("NO"), the method continues at 1030.

At 1030, a determination is made as to whether or not a voice signature is different from a prior voice signature. A voice signature can include data regarding, frequency, pitch, tone, accent, placement of silence, frequency of filler words (e.g., uh and um), spacing of words, repetition, inflection, pace, volume, and clarity, among other things. The determination of difference can be based on a threshold level of difference to account for various circumstances, for example, for background noise or a user with a cold. Further, aspects of the voice signature can be weighted differently. For example, the presence or absence of an accent may be weighted more heavily than placement of silence. If at 1030, it is determined that there is a difference in voice signature ("YES"), the difference is reported at 1050. Alternatively, if it is determined that there is no voice signature difference ("NO"), the method continues at 1040.

At 1040, a determination is made as to whether or not there is a difference in emotion associated with the spoken narrative as compared to a prior narrative, for example provided during a setup process. Emotion can be associated with the entire narrative or portions thereof. Emotion can be detected based on key words, tone of voice, as well as changes in speech patterns, among other things. If it is determined at 1040, that the emotion associated with narratives is different ("YES"), the difference is reported at 1050. Alternatively, if it is determined that there is no difference in emotion ("NO"), the method can terminate.

Aspects of the subject disclosure pertain to the technical problem of access control systems, and, more particularly, user authentication. Technical features associated with addressing this problem include analysis of a vocal narrative, and comparison of a subsequent vocal narrative or question answers. Further, analysis of a vocal narrative can involve determining or inferring a voice signature and emotion associated with a narrative.

The subject disclosure provides for various products and processes that perform, or are configured to perform, narrative authentication. What follows are one or more exemplary systems and methods.

An authentication system comprises a processor coupled to a memory that includes instructions that when executed by the processor cause the processor to: request vocal input with respect to a narrative; analyze the vocal input to infer one or more emotions; comparing the one or more emotions with predetermined emotions of the narrative; and compute an authentication score based on a result of the comparing. The narrative can in one instance comprise a personal story of a user seeking authentication. The system can further comprise instructions that cause the processor to infer the one or more emotions based on at least one of tone of voice or a change in speech pattern. In one instance, the vocal input comprises a retelling of the narrative. In another instance, one or more questions can be generated pertaining to the narrative, and the vocal input corresponds to an answer to at least one of the one or more questions. The system further comprises instructions that cause the processor to evaluate the answer to the one or more questions versus correct answers and compute the authentication score based on the evaluation of the answer. The one or more questions can require a binary response or a short answer.

Further, at least one of the one or more questions can be based on a false statement of fact with respect to the narrative. The system can further comprise instructions that cause the processor to: determine a voice signature associated with the vocal input; compare the voice signature to a second voice signature associated with the narrative; and compute the authentication score based on a result of the compare.

An authentication method comprises executing, on a processor, instructions that cause the processor to perform operations comprising: requesting vocal input with respect to a narrative comprising a story of a user seeking authentication; inferring one or more emotions from the vocal input based on at least one of keyword, tone of voice, or changes to speech pattern; comparing the one or more emotions with predetermined emotions associated with the narrative; and computing an authentication score based on a result of the comparing, wherein the authentication score reflects extent of match between the one or more emotions and the predetermined emotions. In one scenario, requesting the vocal input comprises requesting retelling of the story. In another scenario, requesting the vocal input comprises requesting an answer to one or more questions associated with the narrative. The method further comprises operations comprising evaluating the answer to the one or more questions versus correct answers and computing the authentication score based on the evaluation of the answer. The method further comprises requesting an answer to a question that is based on a false statement of fact with respect to the narrative. The method further comprises operations comprising: determining a voice signature associated with the vocal input; comparing the voice signature to a second voice signature associated with the narrative; and computing the authentication score based on a result of the comparing.

A method comprises executing, on a processor, instructions that cause the processor to perform operations comprising: receiving a vocal narrative comprising a personal story of customer of a financial institution in response to a request; inferring one or more emotions from the vocal narrative based at least on one keyword, tone of voice, or change in speech pattern; and saving the vocal narrative and the one or more emotions to a data store for subsequent processing.

The method further comprises operations comprising: requesting vocal input from the customer with respect to the vocal narrative in response to receipt of a call from the customer; inferring one or more emotions from the vocal input based at least one of keyword, tone of voice, or change in speech pattern; comparing the one or more emotions with predetermined emotions associated with the vocal narrative; and computing an authentication score based on the comparing. In one instance, requesting the vocal input comprises requesting a retelling of the vocal narrative. Furthermore, the method comprises receiving a retold vocal narrative; comparing the retold vocal narrative with the vocal narrative; and computing the authentication score based on a degree of similarity between content of the vocal narrative and retold vocal narrative. In another instance, requesting the vocal input comprises requesting answers to one or more questions associated with the vocal narrative; evaluating the answers with respect to correct answers; and computing the authentication score based on the evaluation of the answers.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 11:
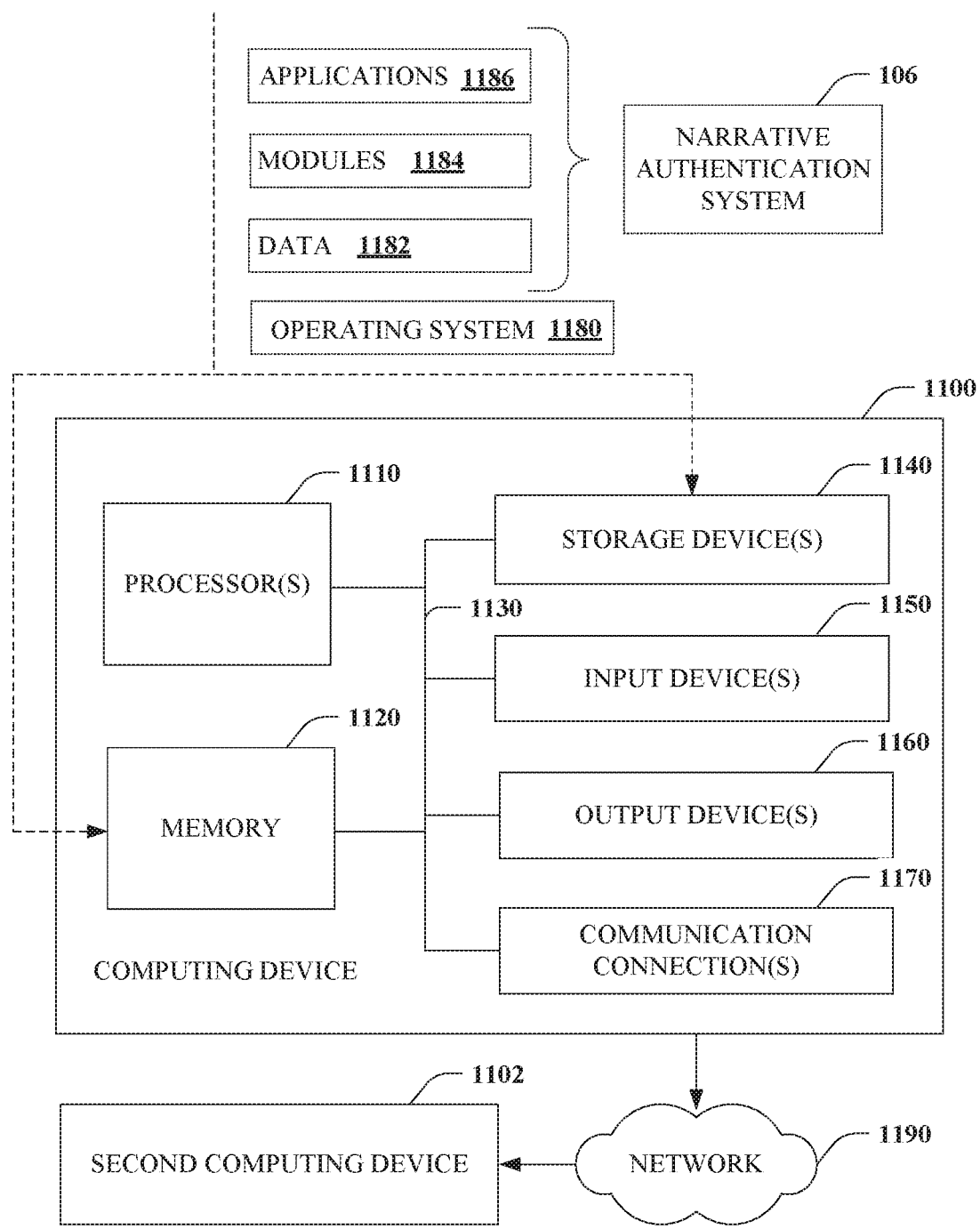
FIG. 11 is a schematic block diagram illustrating a suitable operating environment for aspects of the subject disclosure.

To provide a context for the disclosed subject matter, FIG. 11 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 11, illustrated is an example computing device 1100 (e.g., desktop, laptop, tablet, watch, server, hand-held, programmable consumer or industrial electronics, set-top box, game system, compute node . . . ). The computing device 1100 includes one or more processor(s) 1110, memory 1120, system bus 1130, storage device(s) 1140, input device(s) 1150, output device(s) 1160, and communications connection(s) 1170. The system bus 1130 communicatively couples at least the above system constituents. However, the computing device 1100, in its simplest form, can include one or more processors 1110 coupled to memory 1120, wherein the one or more processors 1110 execute various computer executable actions, instructions, and or components stored in the memory 1120.

The processor(s) 1110 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1110 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1110 can be a graphics processor unit (GPU) that performs calculations with respect to digital image processing and computer graphics.

The computing device 1100 can include or otherwise interact with a variety of computer-readable media to facilitate control of the computing device to implement one or more aspects of the disclosed subject matter. The computer-readable media can be any available media that accessible to the computing device 1100 and includes volatile and non-volatile media, and removable and non-removable media. Computer-readable media can comprise two distinct and mutually exclusive types, namely storage media and communication media.

Storage media includes volatile and nonvolatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 1100. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 1120 and storage device(s) 1140 are examples of computer-readable storage media. Depending on the configuration and type of computing device, the memory 1120 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 1100, such as during start-up, can be stored in nonvolatile memory, while volatile memory can act as external cache memory to facilitate processing by the processor(s) 1110, among other things.

The storage device(s) 1140 include removable/non-removable, volatile/non-volatile storage media for storage of vast amounts of data relative to the memory 1120. For example, storage device(s) 1140 include, but are not limited to, one or more devices such as a magnetic or optical disk drive, floppy disk drive, flash memory, solid-state drive, or memory stick.

Memory 820 and storage device(s) 1140 can include, or have stored therein, operating system 1180, one or more applications 1186, one or more program modules 1184, and data 1182. The operating system 1180 acts to control and allocate resources of the computing device 1100. Applications 1186 include one or both of system and application software and can exploit management of resources by the operating system 1180 through program modules 1184 and data 1182 stored in the memory 1120 and/or storage device(s) 1140 to perform one or more actions. Accordingly, applications 1186 can turn a general-purpose computer 1100 into a specialized machine in accordance with the logic provided thereby.

All or portions of the disclosed subject matter can be implemented using standard programming and/or engineering techniques to produce software, firmware, hardware, or any combination thereof to control the computing device 1100 to realize the disclosed functionality. By way of example and not limitation, all or portions of the narrative authentication system 106 can be, or form part of, the application 1186, and include one or more modules 1184 and data 1182 stored in memory and/or storage device(s) 1140 whose functionality can be realized when executed by one or more processor(s) 1110.

In accordance with one particular embodiment, the processor(s) 1110 can correspond to a system on a chip (SOC) or like architecture including, or in other words integrating, both hardware and software on a single integrated circuit substrate. Here, the processor(s) 1110 can include one or more processors as well as memory at least similar to the processor(s) 1110 and memory 1120, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the narrative authentication system 106 and/or functionality associated therewith can be embedded within hardware in a SOC architecture.

The input device(s) 1150 and output device(s) 1160 can be communicatively coupled to the computing device 1100. By way of example, the input device(s) 1150 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 1160, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1150 and output device(s) 1160 can be connected to the computing device 1100 by way of wired connection (e.g., bus), wireless connection (e.g., Wi-Fi, Bluetooth . . . ), or a combination thereof.

The computing device 1100 can also include communication connection(s) 1170 to enable communication with at least a second computing device 1102 by means of a network 1190. The communication connection(s) 1170 can include wired or wireless communication mechanisms to support network communication. The network 1190 can correspond to a local area network (LAN) or a wide area network (WAN) such as the Internet. The second computing device 1102 can be another processor-based device with which the computing device 1100 can interact. For instance, the computing device 1100 can correspond to a service center system and the second computing device 1102 can correspond to a service truck or driver device communicatively coupled to the service center.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system comprising:
   a processor coupled to a memory that includes instructions that when executed by the processor cause the processor to:
   receive, via a communications connection and in response to a request for a first narrative including one or more details about the first narrative, a first data packet comprising first vocal input data including the first narrative;
   make a first determination, by an assistance component and using natural language processing techniques to compare terms detected in the first vocal input data to terms associated with predetermined terms addressing the one or more details about the first narrative, that the first narrative is missing at least one of the one or more details;
   transmit, via the communications connection and in response to the first determination, a request for an updated first narrative that includes the first narrative supplemented with the at least one of the one or more details that is missing from the first narrative;
   receive, via the communications connection and in response to the request for the updated first narrative, an updated first data packet comprising updated first vocal input data including the updated first narrative;
   detect, by an emotion detection component, one or more emotions conveyed by a recitation of the updated first narrative from a first voice signature compiled using the updated first vocal input data;
   receive, via the communications connection, a second data packet comprising second vocal input data including a second narrative;
   detect, by the emotion detection component, one or more emotions conveyed by a recitation of the second narrative from a second voice signature compiled using the second vocal input data;
   compare, by a match component, the one or more emotions detected from the second voice signature with the one or more emotions detected from the first voice signature;
   make a second determination, by the match component, to determine an authentication score based on a result of the comparison, wherein the authentication score corresponds to a degree of match between the one or more emotions detected in the second voice signature and the one or more emotions detected in the first voice signature;
   make a third determination, by the match component and based on the authentication score, that a user that provided the second vocal input data is authorized to access and interact with protected resources; and
   authorizing, by the processor and in response to the third determination, the user that provided the second vocal input data to access and interact with the protected resources.

2. The system of claim 1, wherein the first narrative, the updated first narrative, and the second narrative comprise a personal story of the user.

3. The system of claim 1, further comprising instructions that cause the processor to infer the one or more emotions based on at least one of tone of voice or a change in speech pattern detected in respective ones of the first and second voice signatures.

4. The system of claim 1, wherein the second narrative of the second vocal input data comprises a retelling of the updated first narrative included in the updated first vocal input data.

5. The system of claim 1, further comprising instructions that cause the processor to: generate, by a question component, one or more questions about the updated first narrative included in the updated first vocal input data.

6. The system of claim 5, wherein the second narrative included in the second vocal input data is an answer to at least one of the one or more questions.

7. The system of claim 6, further comprising instructions that cause the processor to evaluate the answer to the one or more questions versus correct answers and compute the authentication score further based on the evaluation of the answer.

8. The system of claim 5, wherein at least one of the one or more questions requires a binary response.

9. The system of claim 5, wherein at least one of the one or more questions is based on a false statement of fact with respect to the updated first narrative included in the updated first vocal input data.

10. The system of claim 1, wherein the predetermined terms addressing the one or more details about the first narrative comprise who, what, when, and where.

11. A method comprising:
    executing, on a processor, instructions that cause the processor to perform operations comprising:
    receiving, in response to a request for a first narrative including one or more details about the first narrative, a first data packet comprising first vocal input data including the first narrative;
    making a first determination, by using natural language processing techniques to compare terms detected in the first vocal input data to terms associated with predetermined terms addressing the one or more details about the first narrative, that the first narrative is missing at least one of the one or more details;
    transmitting, in response to the first determination, a request for an updated first narrative that includes the first narrative supplemented with the at least one of the one or more details that is missing from the first narrative;

receiving, in response to the request for the updated first narrative, an updated first data packet comprising updated first vocal input data including the updated first narrative;

detecting one or more emotions conveyed by a recitation of the updated first narrative from a first voice signature compiled using the updated first vocal input data;

receiving a second data packet comprising second vocal input data including a second narrative;

detecting one or more emotions conveyed by a recitation of the second narrative from a second voice signature compiled using the second vocal input data;

comparing the one or more emotions detected from the second voice signature with the one or more emotions detected from the first voice signature;

making a second determination to determine an authentication score based on a result of the comparison, wherein the authentication score corresponds to a degree of match between the one or more emotions detected in the second voice signature and the one or more emotions detected in the first voice signature;

making a third determination, based on the authentication score, that a user that provided the second vocal input data is authorized to access and interact with protected resources; and authorizing, in response to the third determination, the user that provided the second vocal input data to access and interact with the protected resources.

12. The method of claim 11, wherein the second narrative of the second vocal input data comprises a retelling of the updated first narrative included in the updated first vocal input data.

13. The method of claim 11, wherein the second vocal input data comprises an answer to one or more questions associated with the updated first narrative of the updated first vocal input data.

14. The method of claim 13, further comprising evaluating the answer to the one or more questions versus correct answers and computing the authentication score further based on the evaluation of the answer.

15. The method of claim 13, further comprising requesting an answer to a question that is based on a false statement of fact with respect to the updated first narrative included in the updated first vocal input data.

16. A non-transitory computer-readable storage medium comprising computer-executable instructions, that, when executed via a processor, cause the processor to perform operations comprising:

receiving, in response to a request for a first narrative including one or more details about the first narrative, a first data packet comprising first vocal input data including the first narrative;

making a first determination, by using natural language processing techniques to compare terms detected in the first vocal input data to terms associated with predetermined terms addressing the one or more details about the first narrative, that the first narrative is missing at least one of the one or more details;

transmitting, in response to the first determination, a request for an updated first narrative that includes the first narrative supplemented with the at least one of the one or more details that is missing from the first narrative;

receiving, in response to the request for the updated first narrative, an updated first data packet comprising updated first vocal input data including the updated first narrative;

detecting one or more emotions conveyed by a recitation of the updated first narrative from a first voice signature compiled using the updated first vocal input data;

receiving a second data packet comprising second vocal input data including a second narrative;

detecting one or more emotions conveyed by a recitation of the second narrative from a second voice signature compiled using the second vocal input data;

comparing the one or more emotions detected from the second voice signature with the one or more emotions detected from the first voice signature;

making a second determination to determine an authentication score based on a result of the comparison, wherein the authentication score corresponds to a degree of match between the one or more emotions detected in the second voice signature and the one or more emotions detected in the first voice signature;

making a third determination, based on the authentication score that a user that provided the second vocal input data is authorized to access and interact with protected resources; and authorizing, in response to the third determination, the user that provided the second vocal input data to access and interact with the protected resources.

17. The non-transitory computer-readable storage medium of claim 16, wherein the operations further comprise:

generating one or more questions about the updated first narrative recited in the updated first vocal input data.

18. The non-transitory computer-readable storage medium of claim 17, wherein the second narrative recited in the second vocal input data is an answer to at least one of the one or more questions.

19. The non-transitory computer-readable storage medium of claim 16, wherein the second narrative of the second vocal input data comprises a retelling of the updated first narrative of the updated first vocal input data.

* * * * *